UNITED STATES PATENT OFFICE.

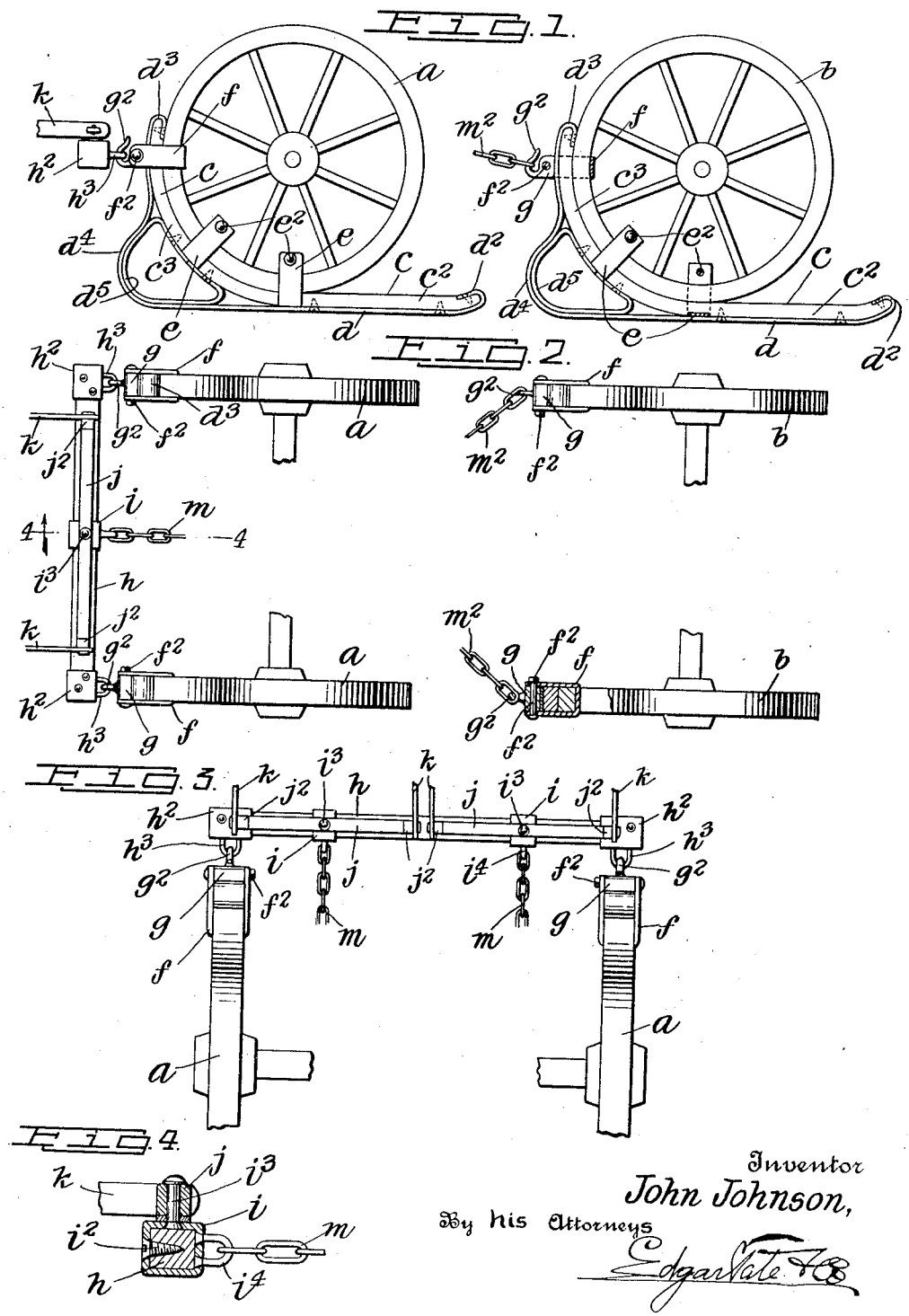
J. JOHNSON.
WHEEL ATTACHED SLED RUNNER.
APPLICATION FILED MAR. 6, 1918.
1,328,629.
Patented Jan. 20, 1920.
Inventor
John Johnson,
By his Attorneys

JOHN JOHNSON, OF NEW YORK, N. Y.

WHEEL-ATTACHED SLED-RUNNER.

1,328,629.  Specification of Letters Patent.  Patented Jan. 20, 1920.

Application filed March 6, 1918. Serial No. 220,714.

*To all whom it may concern:*

Be it known that I, JOHN JOHNSON, a citizen of the United States, and residing at New York, in the county of Bronx and State of New York, have invented certain new and useful Improvements in Wheel-Attached Sled-Runners, of which the following is a specification, such as will enable those skilled in the art to which it appertains to make and use the same.

This invention relates to the conversion of wheeled vehicles into sleighs and particularly to means for drawing vehicles of this class when converted into sleighs, and the object of the invention is to provide an improved mechanism of the class specified which is simple in construction, efficient in operation and comparatively inexpensive.

The invention is fully disclosed in the following specification, of which the accompanying drawing forms a part, in which the separate parts of my improvement are designated by suitable reference characters in each of the views, and in which:—

Figure 1 is a side view showing the wheels of one side of a horse drawn vehicle provided with runner attachments and showing my improvement connected therewith;

Fig. 2 is a plan view of the construction shown in Fig. 1;

Fig. 3 is a view similar to Fig. 2 but omitting part of the construction and showing a modification; and, Fig. 4 is a section on the line 4—4 of Fig. 2 and on an enlarged scale.

In Figs. 1 and 2 of the drawing, I have shown at $a$ the front wheels of a horse drawn vehicle and at $b$ the rear wheels of said vehicle. Detachably connected with the wheels $a$ and $b$ are runner attachments $c$, each of which is composed of a strip of wood $c^2$, the front end of which is bent to fit the curvature of the wheels as shown at $c^3$ and extends upwardly to a point slightly above the horizontal center of said wheels and a sheet metal strip $d$ is secured to the face of the strip $c^2$ and the ends thereof are bent around the end portions of said strip as shown at $d^2$ and $d^3$ and secured thereto.

The sheet metal strip $d$ is bent to form a forwardly directed loop $d^4$ between which and the curved portions $c^3$ of the strips $c^2$ is placed a reinforcing loop $d^5$ which is secured to the loop portion $d^4$ of the sheet metal strip $d$ and to the part $c^3$ of the strip $c^2$.

The runner attachments $c$ are detachably connected with the rim of the wheels $a$ and $b$ by a plurality of clamps $e$ and $f$. The clamps $e$ are countersunk in the face portion of the strips $c^2$ of wood, as clearly indicated in Fig. 1, and the ends thereof extend inwardly, and bolts $e^2$ are passed therethrough to clamp the rim of the wheels between the same to secure the attachments in place. The clamps $f$ are U-shaped in form as clearly shown in Fig. 2 and the ends thereof are directed outwardly and bolts $f^2$ are passed through said ends to secure said clamps to the rims of the wheels, and to said runner attachments as clearly indicated in Figs. 1 and 2, and pivoted between the ends of the said clamps $f$ on the bolts $f^2$ are hook devices $g$ provided with upwardly directed hooks $g^2$, as clearly indicated in Figs. 1 and 2 of the drawing.

Detachably connected with the hook devices $g$ is a transverse bar $h$ to the ends of which are secured sheet metal reinforcing casings $h^2$ to the inner face of which are secured loops or eyes $h^3$ adapted to receive the hooks $g^2$ of the hook devices $g$.

In the construction shown in Figs. 1 and 2, a sheet metal casing $i$ is secured to the bar $h$ centrally thereof by means of a screw $i^2$, and connected with the top face of said casing is a pivot pin $i^3$ on which is mounted a whiffle tree $j$ which has a swivel connection with the casing $i$ as will be understood, and the ends of the whiffle tree $j$ are provided with attachments $j^2$ adapted to receive the end portions of the harness traces $k$, in the usual manner.

I also preferably connect a chain or other device $m$ with a backwardly directed loop or eye $i^4$ secured to the casing $i$. The other end of said chain $m$ may be connected with any rigid part of the vehicle, but this connection is not shown for the reason that it forms no part of the invention, the purpose of the chain or other device $m$ being to reinforce the bar $h$ so as to relieve the strain on the front wheels $a$ in the operation of drawing the vehicle as will be readily understood. I also preferably employ chains or similar devices $m^2$ which are adapted to be connected with the hooks $g^2$ of the hook devices $g$ secured to the runner attachments on the rear wheels $b$. The other ends of said chains may be connected with any suitable part of the vehicle, but this connection is also not shown, and the object of the chains $m^2$ is to steady the rear wheels, when the vehicle is being drawn.

In Fig. 3 of the drawing, I have shown a modified use of my improvement in which two of the sheet metal casings $i$ are secured to the bar $h$ at spaced intervals and the whiffletree $j$ is connected with each of said casings and two pairs of harness traces $k$ are connected with the ends of the whiffletrees $j$, and this form of construction is used in a two horse drawn vehicle, as will be readily understood, and it will be noted that the chains $m$ are employed in connection with each of the casings $i$ and serve to reinforce the end portions of the bar $h$ where the whiffletrees $j$ are connected therewith, and the pull of the load of the vehicle is taken up between the front wheels $a$ and both of the chains $m$ as will be readily understood.

While I have shown and described my improvement as designed for use in connection with one or two horse drawn vehicles, it will be understood that the same may be employed in connection with vehicles drawn by three horses, in which event a suitable number of whiffletrees $j$ will be employed and it will also be understood that my invention is not limited to the specific form of runner attachments herein shown and described.

Having fully described my invention, what I claim as new and desire to secure by Letters Patent, is:—

1. In a converted vehicle of the class described, runner attachments detachably connected with the wheels of said vehicle, yoke-shaped clamp devices connected with the front portions of the wheels of said vehicle, hook-shaped members mounted between the free sides of said clamp devices, a transverse member adapted to be connected with the front wheels of the vehicle, eye-loops secured to the end portions of said member and adapted to engage the hook-shaped members in said clamp devices, casings mounted on and secured to said member at spaced intervals, whiffle trees pivotally connected with the top of said casings, and means connected with the back of said casings for reinforcing said transverse member.

2. In a converted vehicle of the class described, runners adapted to be detachably connected with the wheels of said vehicle, a plurality of yoke-shaped clamp devices for connecting said runners with said wheels, a hook-shaped device secured to one of said clamp devices on each wheel, a bar adapted to be detachably connected with said last named clamp devices on the front wheels of the vehicle, loops or eyes mounted on the end portions of said bar and adapted to receive said hook-shaped devices, a casing secured to said bar and a whiffletree pivoted to the top of said casing and with which the harness traces are detachably connected.

In testimony that I claim the foregoing as my invention I have signed my name in presence of the subscribing witnesses this 1st day of March, 1918.

JOHN JOHNSON.

Witnesses:
  C. E. MULREANY,
  H. E. THOMPSON.